United States Patent
Lin et al.

(10) Patent No.: US 8,451,607 B2
(45) Date of Patent: May 28, 2013

(54) KEYBOARD

(75) Inventors: Yin-Yu Lin, New Taipei (TW); Yen-Bo Lai, New Taipei (TW); Po-Jen Shih, New Taipei (TW); Shu-I Chen, New Taipei (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 238 days.

(21) Appl. No.: 13/109,010

(22) Filed: May 17, 2011

(65) Prior Publication Data

US 2012/0170220 A1 Jul. 5, 2012

(30) Foreign Application Priority Data

Dec. 31, 2010 (TW) ................. 99147229 A

(51) Int. Cl.
*H05K 7/20* (2006.01)
*G06F 3/02* (2006.01)

(52) U.S. Cl.
USPC ............. 361/695; 361/679.46; 361/679.48; 361/679.49; 361/679.51; 361/690; 361/692; 165/104.33; 454/184

(58) Field of Classification Search
USPC ............ 361/679.01, 679.02, 679.11, 679.17, 361/679.46–679.55, 690–697, 714–728; 165/80.3, 104.33, 121–126, 185; 454/184
See application file for complete search history.

(56) References Cited

U.S. PATENT DOCUMENTS

| | | | | |
|---|---|---|---|---|
| 5,828,034 A | * | 10/1998 | Chang | 219/209 |
| 7,288,733 B2 | * | 10/2007 | Yamada et al. | 200/5 A |
| 7,911,780 B2 | * | 3/2011 | Ali et al. | 361/679.47 |
| 8,213,178 B2 | * | 7/2012 | Chen et al. | 361/695 |
| 2005/0226669 A1 | * | 10/2005 | Cheng | 400/490 |
| 2012/0033427 A1 | * | 2/2012 | Chen | 362/253 |

FOREIGN PATENT DOCUMENTS

| | | | |
|---|---|---|---|
| CA | 201084108 Y | * | 7/2008 |
| KR | 2007113521 A | * | 11/2007 |
| KR | 2010112318 A | * | 10/2010 |
| TW | M253002 | | 12/2004 |
| TW | M377851 | | 4/2010 |
| TW | 201207668 A | * | 2/2012 |

OTHER PUBLICATIONS

"Office Action of Taiwan Counterpart Application", issued on Jan. 8, 2013, p. 1-p. 4, in which the listed references were cited.

* cited by examiner

*Primary Examiner* — Michail V Datskovskiy
(74) *Attorney, Agent, or Firm* — Chun-Ming Shih

(57) ABSTRACT

A keyboard including a case, a first fan, an air deflector and a keycap module is provided. The case includes a first side and a second side. The first side has an opening, the second side is disposed at a side of the first side and has at least one hole. The first fan is disposed at the second side and located between the first side and the second side. The air deflector is disposed between the first side and the second side of the case and corresponding to the hole of the second side and the opening of the first side. The keycap module is disposed at the opening of the first side.

7 Claims, 6 Drawing Sheets

KEYBOARD

CROSS-REFERENCE TO RELATED APPLICATION

This application claims the priority benefit of Taiwan application serial no. 99147229, filed Dec. 31, 2010. The entirety of the above-mentioned patent application is hereby incorporated by reference herein and made a part of this specification.

BACKGROUND OF THE INVENTION

1. Field of the Invention

The invention generally relates to a keyboard, and more particularly, to a keyboard having a fan.

2. Description of Related Art

Along with the rapid development of science and technology and the advanced life quality of human being day by day, computers are broadly applied in various information situations such as the following fields: traffic information, business deal, word processing, computer graphics and entertainment leisure. In order to ensure the data correctness and the input rapidity, keyboard is a quite important device, which provides a user with an operation platform of a computer host to stroke keycaps so as to execute instructions and key-in. However, when a user manipulates the keyboard for a long time, or due to the physique reason of the user, hand perspiration phenomena is produced during manipulating the keyboard, which not only affects the stability of the user during manipulating the keyboard, but also makes the user produce discomfort feeling during operation.

SUMMARY OF THE INVENTION

Accordingly, the invention is directed to a keyboard, in which a fan is disposed and a disposed air deflector guides air-flow to a keycap module so that the air-flow blows out from the gaps between an opening of a first side and the keycap module.

The invention provides a keyboard, which includes a case, a first fan, an air deflector and a keycap module. The case includes a first side and a second side. The first side has an opening, the second side is disposed at a side of the first side and has at least one hole. The first fan is disposed at the second side and located between the first side and the second side. The air deflector is disposed between the first side and the second side of the case and correspondingly to the hole of the second side and the opening of the first side. The keycap module is disposed at the opening of the first side.

In an embodiment of the present invention, the above-mentioned second side has a bottom surface and an inclination surface, the bottom surface includes an obtuse angle with the inclination surface and the first fan is disposed on the inclination surface of the second side.

In an embodiment of the present invention, the above-mentioned second side has a bottom surface and a recess, and the recess is located at the bottom surface and has a first surface and two first side walls. The first side walls are connected between the bottom surface and the first surface, and the first fan is disposed on the first surface, wherein the position of the first surface is corresponding to the position of the opening of the first side. In addition, the first side further has an armrest portion located at a side of the keycap module, the recess is disposed correspondingly to the armrest portion, and the armrest portion has a plurality of open holes.

In an embodiment of the present invention, the above-mentioned keyboard further includes a second fan. The second side further has an inclination surface connecting the bottom surface and the inclination surface is located beside the recess. The second fan is disposed at the inclination surface, wherein the bottom surface includes an obtuse angle with the inclination surface.

Based on the depiction above, the keyboard of the invention employs a fan and an air deflector therein, wherein the air deflector is used for guiding the air-flow produced by the fan to the entire area of the keycap module. In this way, when a user manipulates the keyboard, the fanning air-flow can avoid the palm of the user from producing hand perspiration, which advances the fresh and comfort feeling of the palm of the user during operation.

In order to make the aforementioned and other features and advantages of the invention comprehensible, several exemplary embodiments accompanied with figures are described in detail below.

DESCRIPTION OF THE EMBODIMENTS

Figure 1:
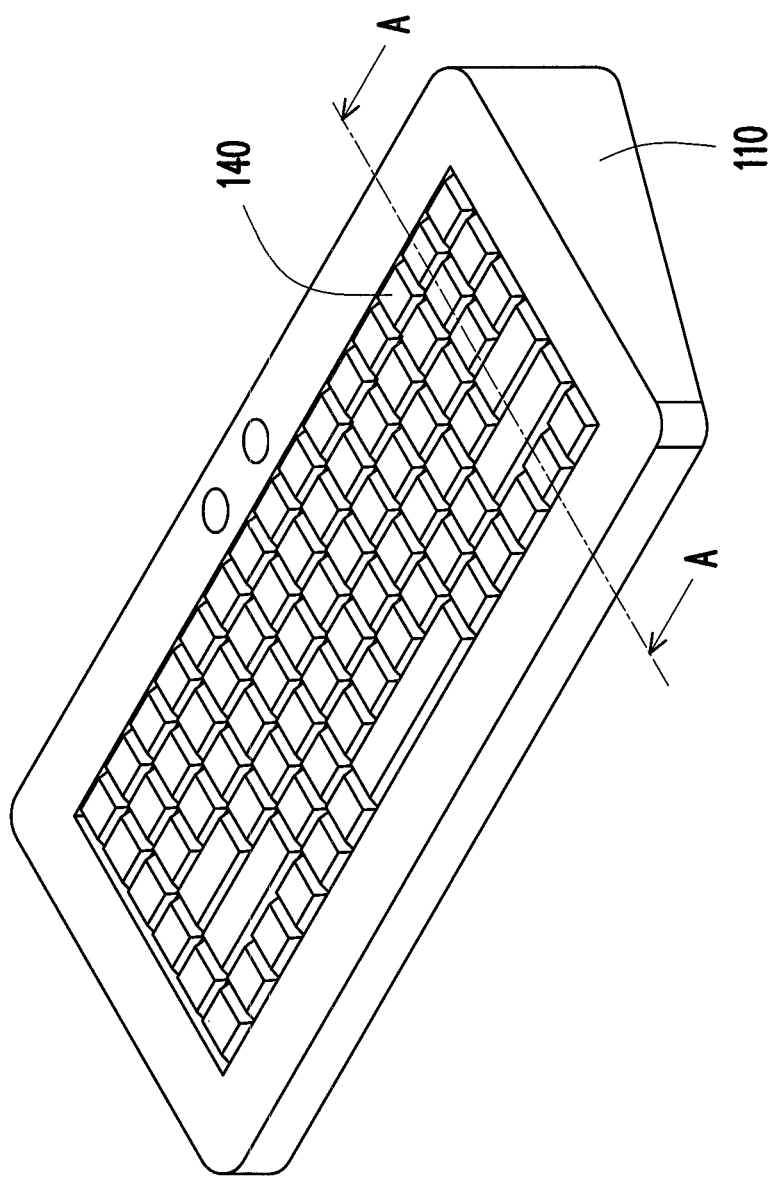
FIG. 1 is a three-dimensional diagram of a keyboard according to the first embodiment of the invention.

Reference will now be made in detail to the preferred embodiments of the invention, examples of which are illustrated in the accompanying drawings. Wherever possible, the same reference numbers are used in the drawings and the description to refer to the same or like parts.

The First Embodiment

Figure 2:
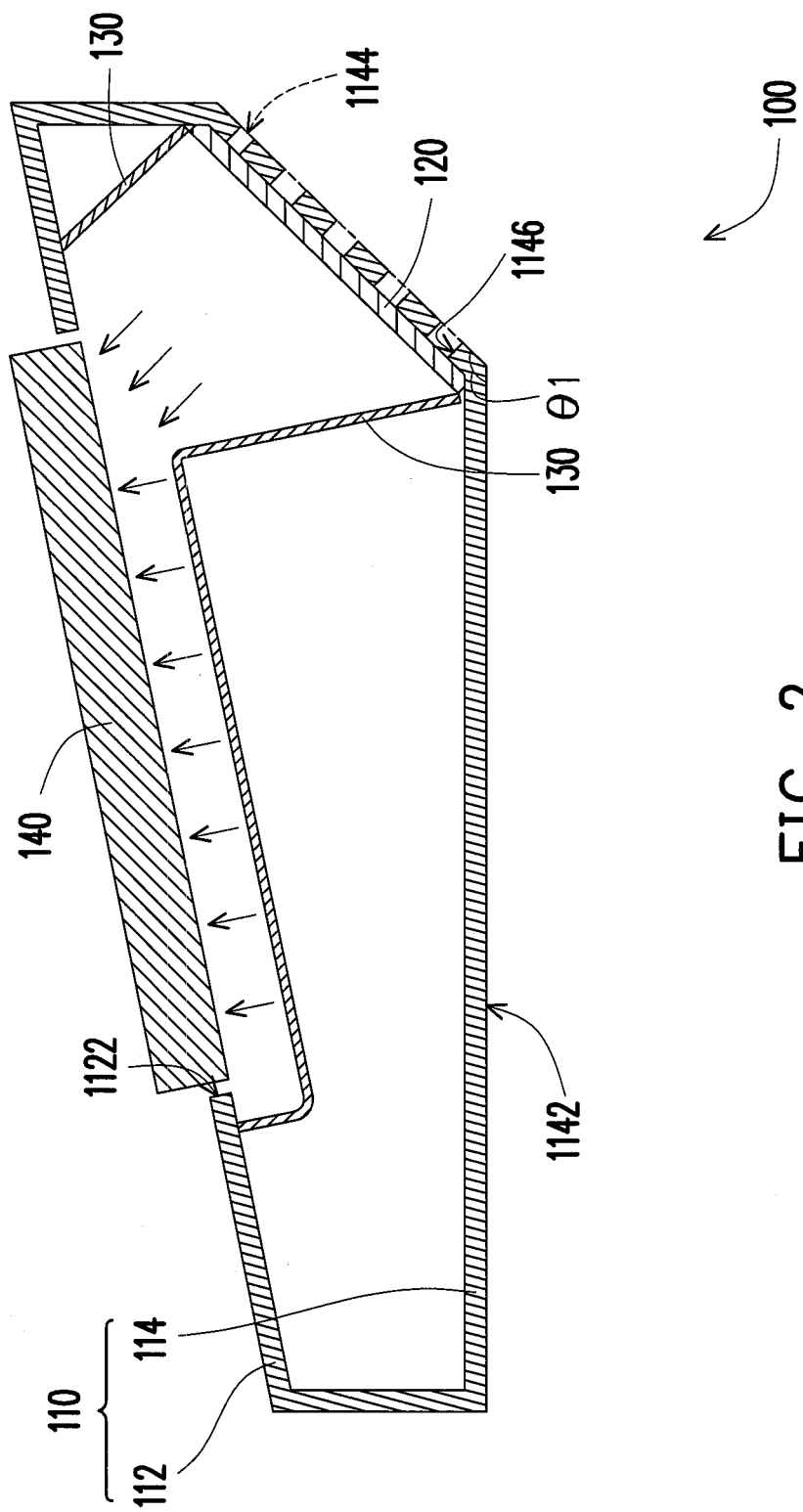
FIG. 2 is a cross-sectional diagram of the keyboard of FIG. 1 along line A-A.

FIG. 1 is a three-dimensional diagram of a keyboard according to the first embodiment of the invention and FIG. 2 is a cross-sectional diagram of the keyboard of FIG. 1 along line A-A. Referring to FIGS. 1 and 2, in the embodiment, a keyboard 100 includes a case 110, a first fan 120, an air deflector 130 and a keycap module 140. The case 110 has a first side 112 and a second side 114. The first side 112 has an opening 1122, the second side 114 is disposed at a side of the first side 112 and the second side 114 has at least one hole 1146. The first fan 120 is disposed at the second side 114 and located between the first side 112 and the second side 114. The air deflector 130 is disposed between the first side 112 and the second side 114 of the case 110, and the air deflector 130 is disposed correspondingly to the hole 1146 of the second side 114 and the opening 1122 of the first side 112, wherein the air deflector 130 of the embodiment is communicated with the opening 1122 of the first side 112 and the hole 1146 of the second side 114, and the keycap module 140 is disposed at the opening 1122 of the first side 112.

Moreover, the second side 114 of the embodiment has a bottom surface 1142 and an inclination surface 1144 connecting the bottom surface 1142, and the bottom surface 1142 includes an obtuse angle with the inclination surface 1144. In FIG. 2, the inclination surface 1144 has the above-mentioned hole 1146 so that the inclination surface 1144 looks like a discontinuous section, but people skilled in the art should be aware that, in fact, the inclination surface 1144 is a continuous surface. The first fan 120 is disposed on the inclination surface 1144 of the second side 114, and the first fan 120 is electrically connected to a computer host (not shown) through, for example, a circuit board of the keyboard 100. Once the first fan 120 receives a start signal from the computer host, the first fan 120 starts to rotate and produces air-flow (in FIG. 2, the flowing direction of the air-flow is represented by a short arrow). At the time, under a forced convection effect, the surrounding air is suctioned by the first fan 120 so as to enter the air deflector 130 from the hole 1146 of the second side 114 via the first fan 120. The air-flow blown out from the first fan 120 is guided by the profile of the air deflector 130 and then flows to the keycap module 140 and finally blows out from the gaps between the opening 1122 of the first side 112 and every keycap (not shown) of the keycap module 140. When a user is manipulating the keyboard 100, the blown out air-flow from the gaps is able to reduce the temperature of the palm of the user so as to lighten the hand perspiration phenomena, which keeps the palm of the user dry and advances the comfort feeling of the user during manipulating the keyboard 100 of the embodiment.

It should be noted that the air deflector 130 of the embodiment can be a cover with integrated formation design, or a plurality of partition boards used together to form the air deflector 130.

The Second Embodiment

Figure 3:
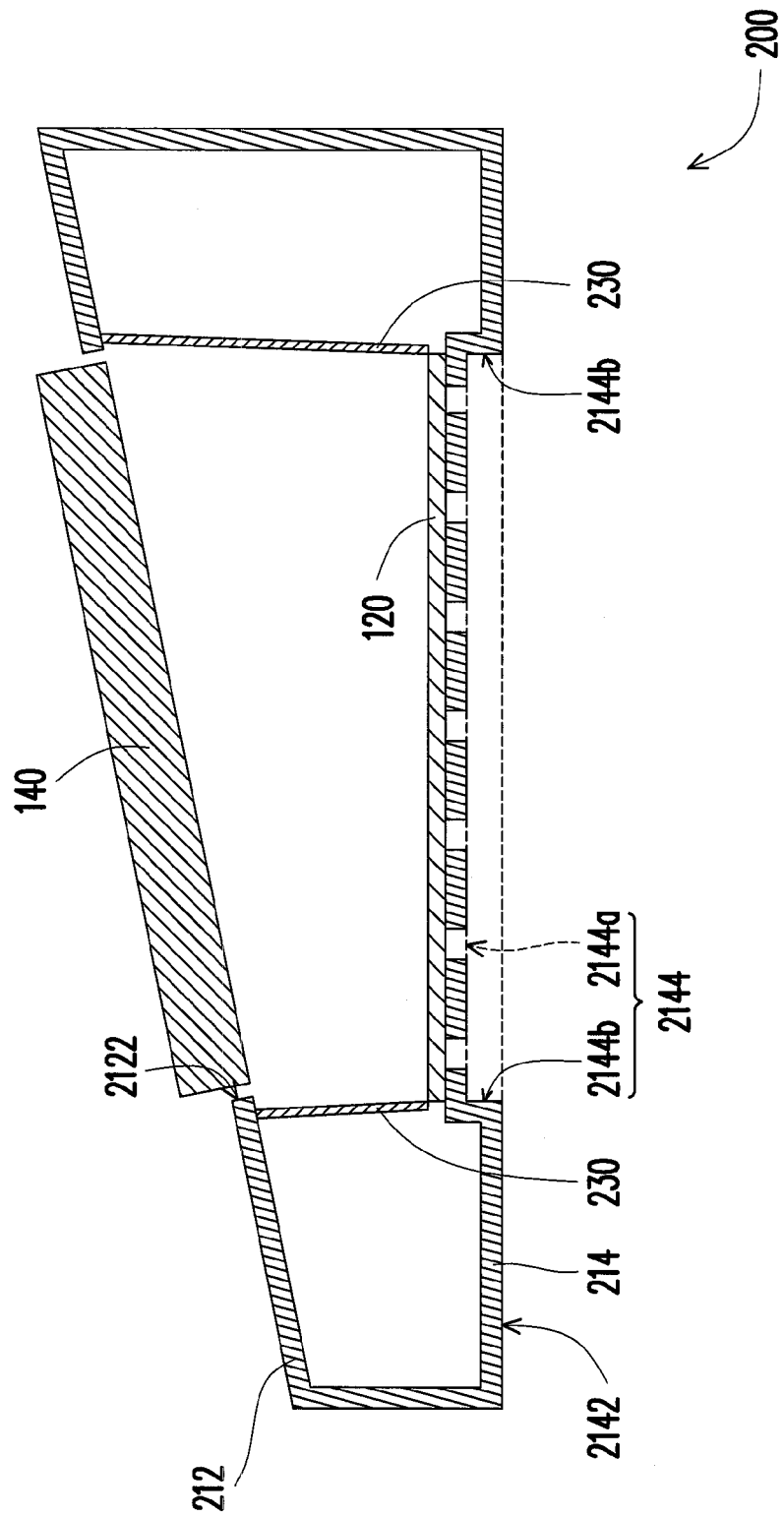
FIG. 3 is a three-dimensional diagram of a keyboard according to the second embodiment of the invention.

FIG. 3 is a three-dimensional diagram of a keyboard according to the second embodiment of the invention. Referring to FIG. 3, in the embodiment, a keyboard 200 is similar to the keyboard 100 of FIG. 2. The difference of the keyboard 200 of the embodiment from the first embodiment is explained as following, wherein wherever possible, the same or similar reference numbers are used in the drawings and the description to refer to the same or like parts. A second side 214 of the embodiment has a bottom surface 2142 and a recess 2144. The recess 2144 is located at the bottom surface 2142 and has a first surface 2144a and two first side walls 2144b, wherein the bottom surface 2142 is parallel to the first surface 2144a (in other unshown embodiments, the bottom surface can be unparallel to the first surface, and the two surfaces are not perpendicular to each other, either). The first side walls 2144b are connected between the bottom surface 2142 and the first surface 2144a, and the position of the first surface 2144a is corresponding to the position of the opening 2122 of the first side 212. In other words, as shown by FIG. 3, the first surface 2144a of the second side 214 is located under the opening 2122 of the first side 212. The first fan 120 is disposed on the first surface 2144a, and the air deflector 230 disposed between the first side 212 and the second side 214 is able to guide air-flow. In the same way, when the first fan 120 starts rotating, the surrounding air of the keyboard 200 (in particular, the air near to the recess 2144 of the second side 214), under the forced convection effect, is suctioned by the first fan 120 so as to enter the air deflector 230. Guided by the air deflector 230, the air-flow blows out from the gaps between the opening 2122 of the first side 212 and the keycaps of the keycap module 140. The above-mentioned disposition can simplify the profile of the air deflector 230 so as to save the cost for forming the air deflector 230.

The Third Embodiment

Figure 4:
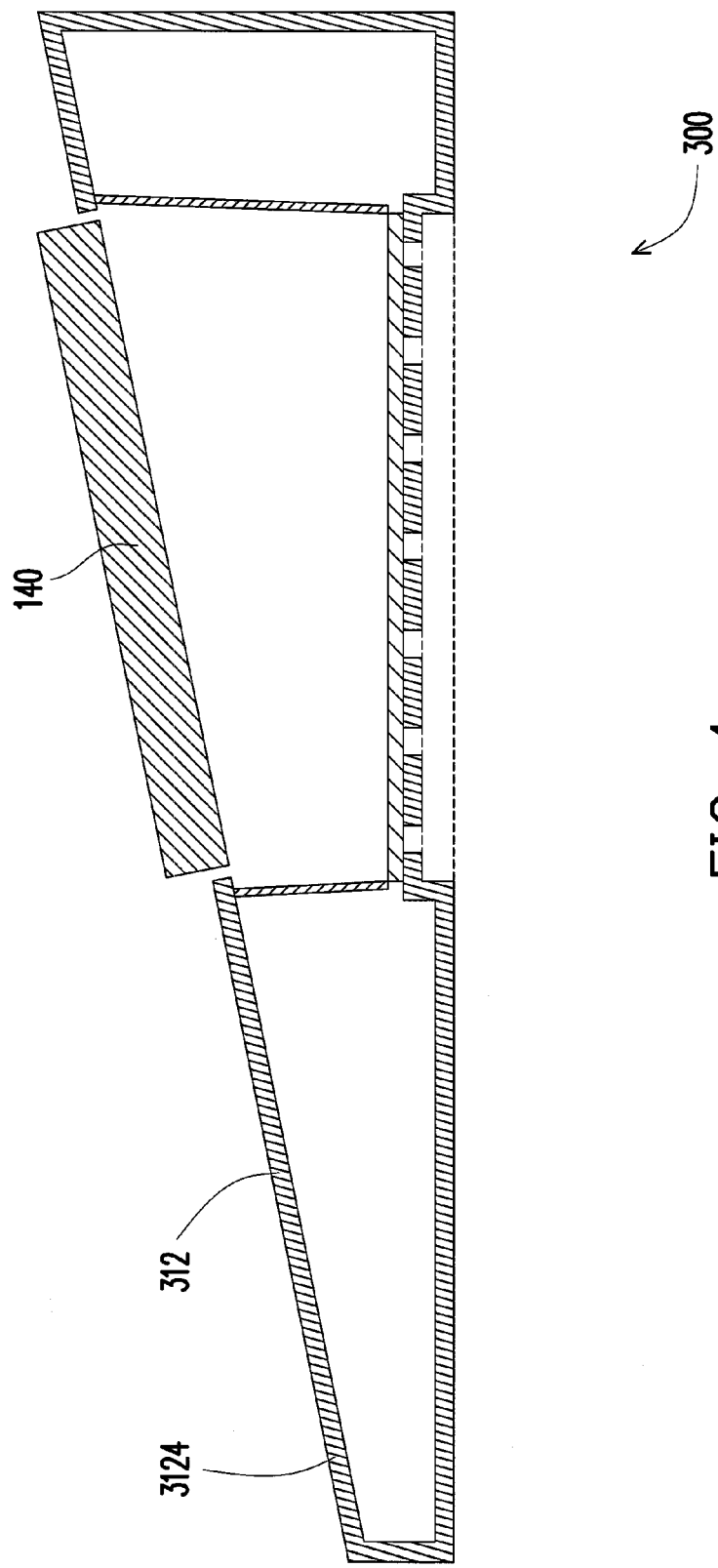
FIG. 4 is a three-dimensional diagram of a keyboard according to the third embodiment of the invention.

FIG. 4 is a three-dimensional diagram of a keyboard according to the third embodiment of the invention. Referring to FIG. 4, in the embodiment, a keyboard 300 of the embodiment is similar to the keyboard 200 of FIG. 3 except that the first side 312 of the embodiment further has an armrest portion 3124 at a side of the keycap module 140. Usually, when a user manipulates a keyboard for long time, the wrist of the user is in suspending status so that the user keeping work after a long duration easily has discomfort feeling during the operation, or the situation may cause myotenositis with the user. By disposing the armrest portion 3124, the supporting range of the hand of a user is enlarged by the armrest portion 3124, which functions to aid supporting the wrist of the user and thereby lighten the hand burden.

The Fourth Embodiment

Figure 5:
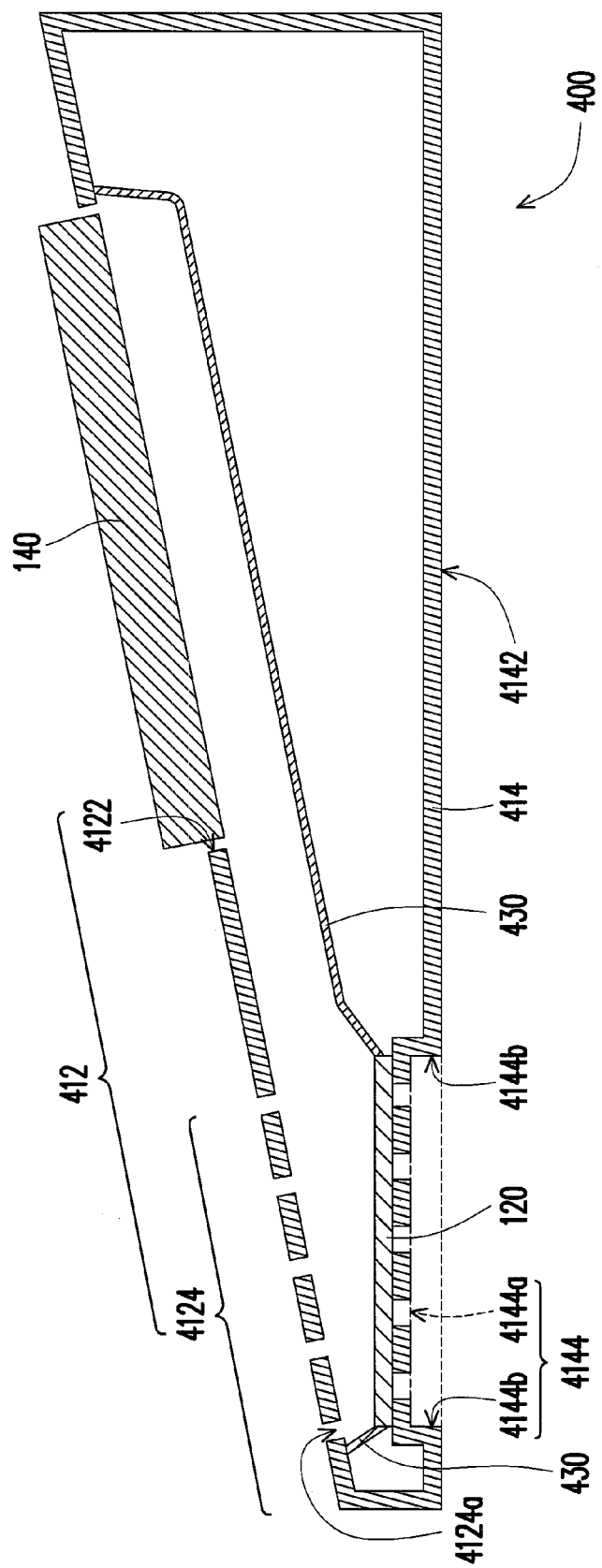
FIG. 5 is a three-dimensional diagram of a keyboard according to the fourth embodiment of the invention.

FIG. 5 is a three-dimensional diagram of a keyboard according to the fourth embodiment of the invention. Referring to FIG. 5, a keyboard 400 of the embodiment is similar to the keyboard 300 of the above-mentioned third embodiment, wherein wherever possible, the same or similar reference numbers are used in the drawings and the description to refer to the same or like parts. The difference of the embodiment from the third embodiment rests in that the first fan 120 of the embodiment is disposed under the armrest portion 4124, and a plurality of open holes 4124a are correspondingly disposed at the armrest portion 4124.

Moreover, the second side 414 of the embodiment has a bottom surface 4142 and a recess 4144, wherein the recess 4144 is located at the bottom surface 4142 and disposed correspondingly to the armrest portion 4124. The recess 4144 has a first surface 4144a and two first side walls 4144b, wherein the first surface 4144a is parallel to the bottom surface 4142 (in other unshown embodiments, the first surface can be unparallel to the bottom surface, and the two surfaces are not perpendicular to each other, either). The first side walls 4144b are connected between the bottom surface 4142 and the first surface 4144a, the position of the first surface 4144a is corresponding to the position of the armrest portion 4124, and the first fan 120 is disposed on the first surface 4144a. In more details, the position of the first fan 120 can further be corresponding to the position of the open holes 4124a of the armrest portion 4124, so that after the air-flow produced under the suction of the first fan 120 enters the air deflector 430, the air-flow flows to the open holes 4124a of the armrest portion 4124 and the opening 4122, and the air-flow simultaneously blows out from the open holes 4124a and the opening 4122. In this way, the air-flow produced by the first fan 120 and blown out from the opening 4122 of the first side 412 can keep the palm of the user dry; meanwhile, the air-flow blown out from the open holes 4124a of the armrest portion 4124 further keeps the wrist of the user dry as well, both of which are helpful for the user to use the keyboard 400 of the embodiment for a long duration.

The Fifth Embodiment

Figure 6:
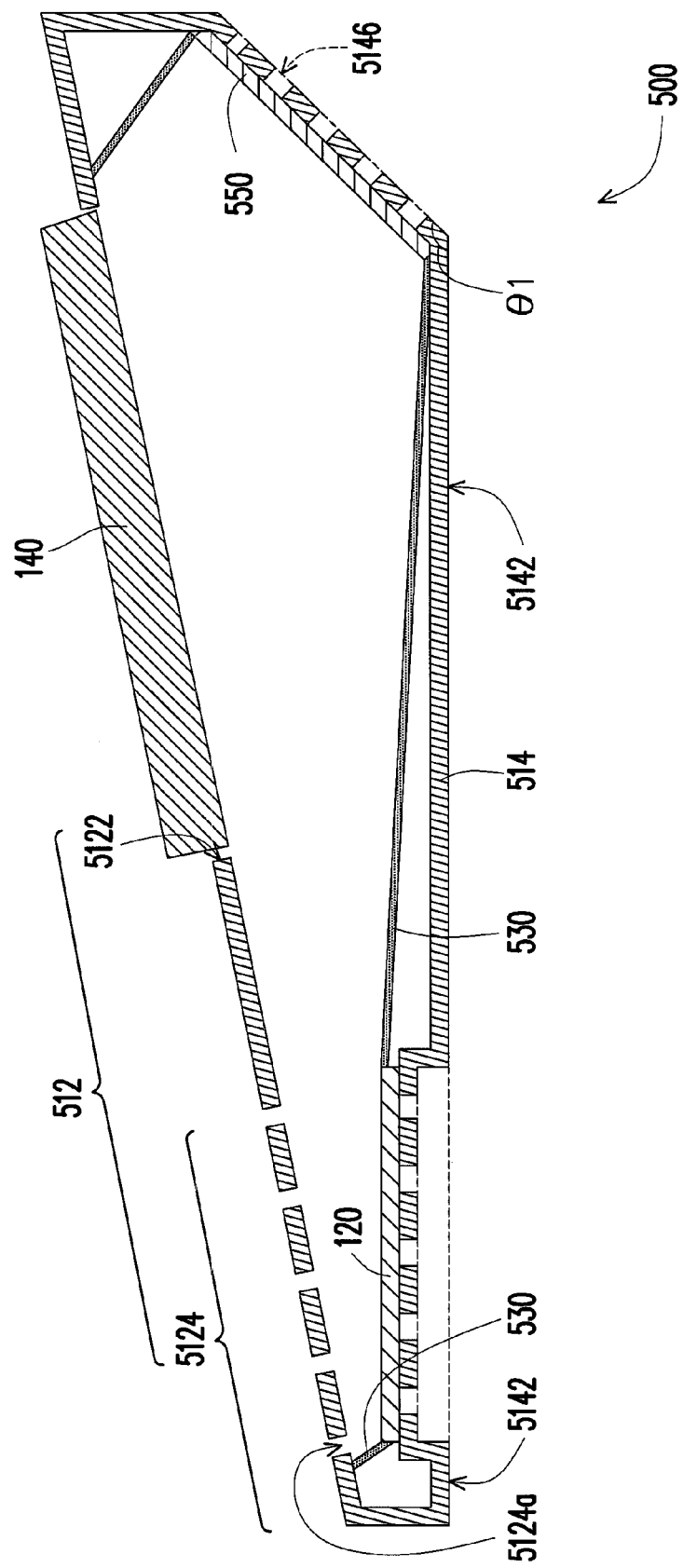
FIG. 6 is a three-dimensional diagram of a keyboard according to the fifth embodiment of the invention.

FIG. 6 is a three-dimensional diagram of a keyboard according to the fifth embodiment of the invention. Referring to FIG. 6, a keyboard 500 of the embodiment is similar to the keyboard 400 of the above-mentioned fourth embodiment, wherein wherever possible, the same or similar reference numbers are used in the drawings and the description to refer to the same or like parts. The difference of the embodiment from the fourth embodiment rests in that in addition to disposing the first fan 120 under the armrest portion 5124, the keyboard 500 of the embodiment further includes a second fan 550, the second side 514 further has an inclination surface 5146 connecting the bottom surface 5142. The inclination surface 5146 includes an obtuse angle with the bottom surface 5142, and the second fan 550 is disposed on the inclination surface 5146.

By disposing the first fan 120 and the second fan 550, the volume of the air-flow blown out from the opening 5122 of the first side 512 of the keyboard 500, the gaps between the plural keycaps of the keycap module 140 and the open holes 5124a of the armrest portion 5124 becomes larger, hence, the palm and the wrist of the user can keep dry for a longer time and the hand perspiration phenomena more unlikely occur.

The above-mentioned embodiments are for explanation, not for limiting the invention. People skilled in the art can change the quantity and the positions of the employed fans, the disposition relationship between the fans and the quantity and the positions of the open holes and the opening, which does not infringe the spirit of the invention and still falls in the scope to be protected by the invention.

In summary, in the keyboard of the invention, a fan and a air deflector are disposed in the case, the inlet of the air deflector faces the fan and the outlet of the air deflector is near to the keycap module, so that the air-flow of the fan can blow out from the gaps between the opening of the first side and the plural keycaps of the keycap module. As a result, when a user is manipulating the keyboard, the fanning air-flow can keep the hand of the user dry, avoid producing hand perspiration and further advance the comfort of the user during using the keyboard.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A keyboard, comprising:
    a case, comprising:
        a first side, defining an opening;
        a second side, disposed at an opposite side of the first side and defining at least one hole;
    a first fan, disposed on the second side and located between the first side and the second side;
    at least one air deflector, disposed between the first side and the second side of the case, wherein the air deflector is disposed correspondingly to the at least one hole on the second side and to the opening of the first side; and
    a keycap module, disposed at the opening on the first side.

2. The keyboard as claimed in claim 1, wherein the second side has a bottom surface and an inclination surface, the bottom surface includes an obtuse angle with the inclination surface and the first fan is disposed on the inclination surface of the second side.

3. The keyboard as claimed in claim 1, wherein the second side has a bottom surface and a recess, the recess is located at the bottom surface and has a first surface and two first side walls, the first side walls are connected between the bottom surface and the first surface, and the first fan is disposed on the first surface.

4. The keyboard as claimed in claim 3, wherein the position of the first surface is corresponding to the position of the opening of the first side.

5. The keyboard as claimed in claim 3, wherein the first side further has an armrest portion located at a side of the keycap module.

6. The keyboard as claimed in claim 5, wherein the recess is disposed correspondingly to the armrest portion, and the armrest portion has a plurality of open holes.

7. The keyboard as claimed in claim 3, further comprising a second fan, wherein the second side further has an inclination surface connecting the bottom surface and located beside the recess, and the second fan is disposed at the inclination surface, wherein the bottom surface includes an obtuse angle with the inclination surface.

* * * * *